Feb. 25, 1930.                W. EBERLE                   1,748,870
               MACHINE FOR GUIDING CUTTING BURNERS
                    Filed Oct. 1, 1928        6 Sheets-Sheet 1

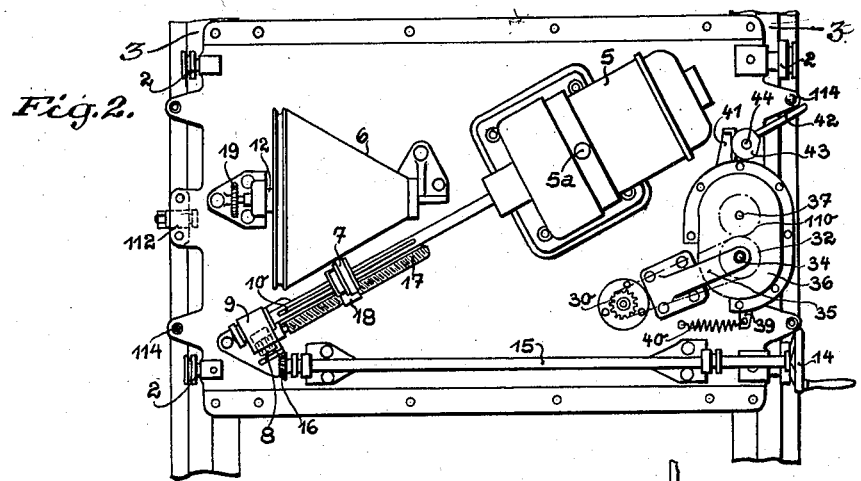
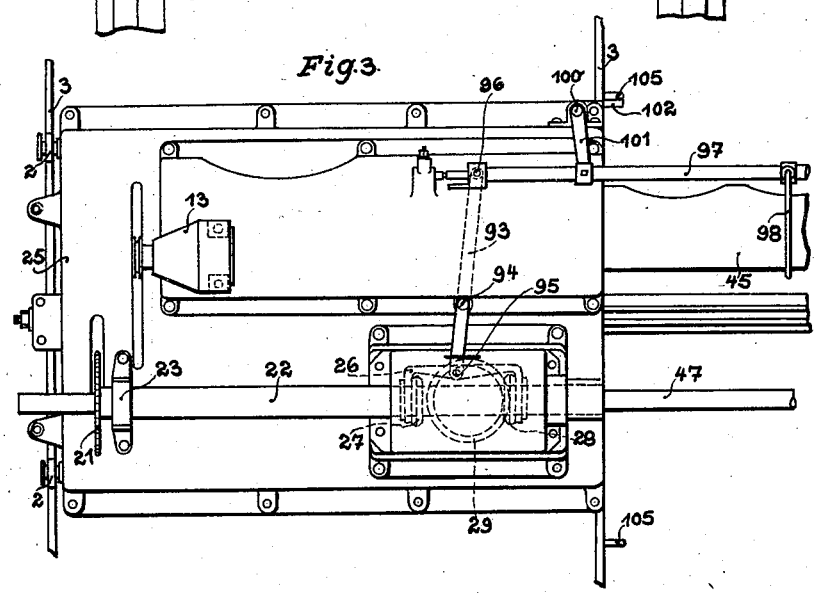
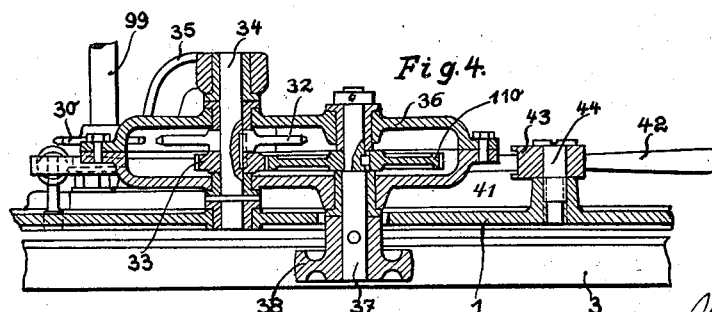

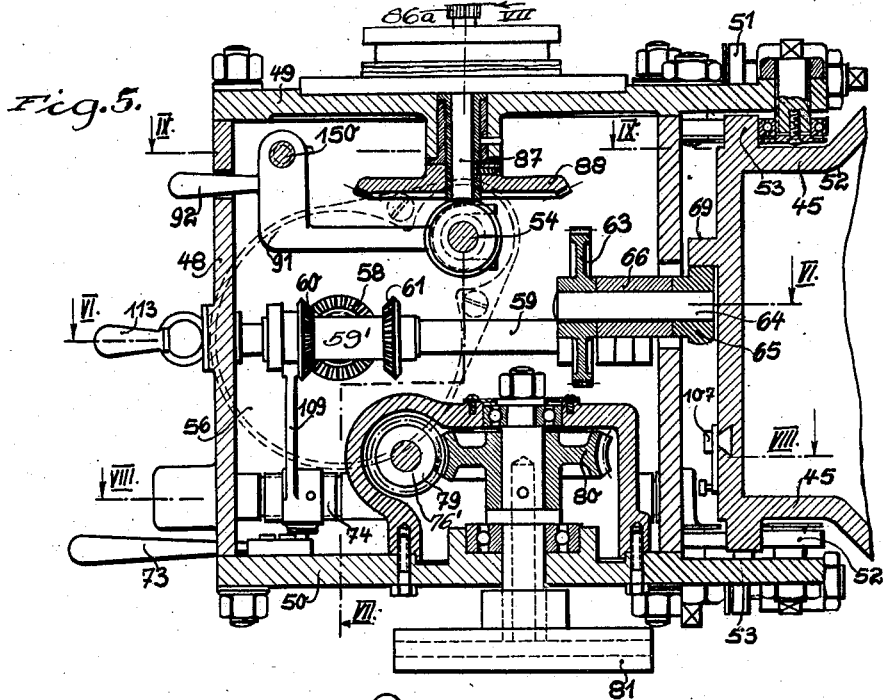
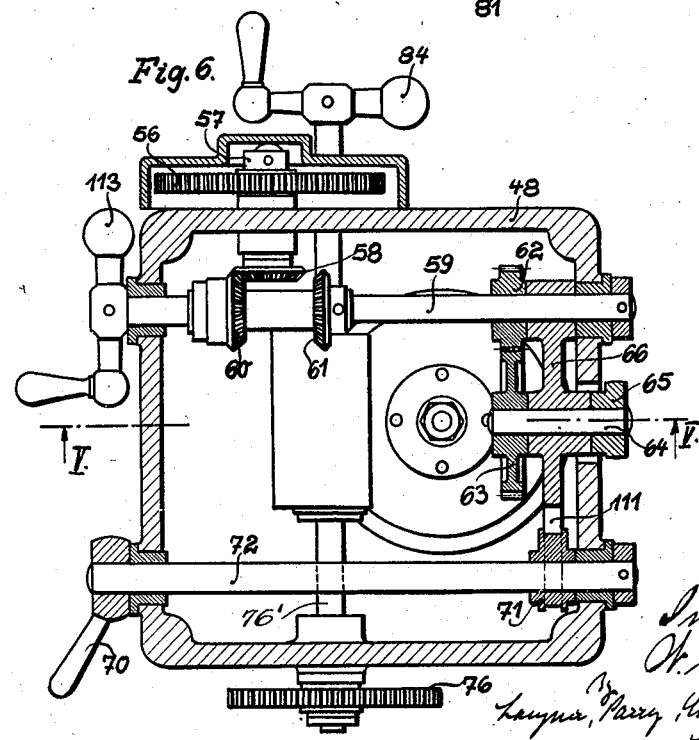

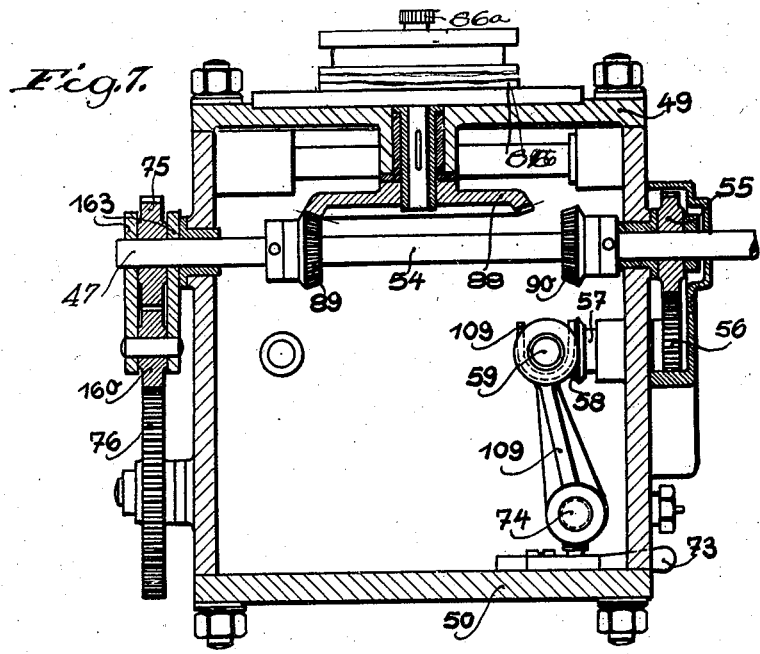
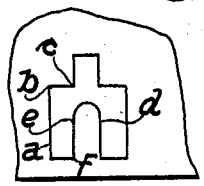
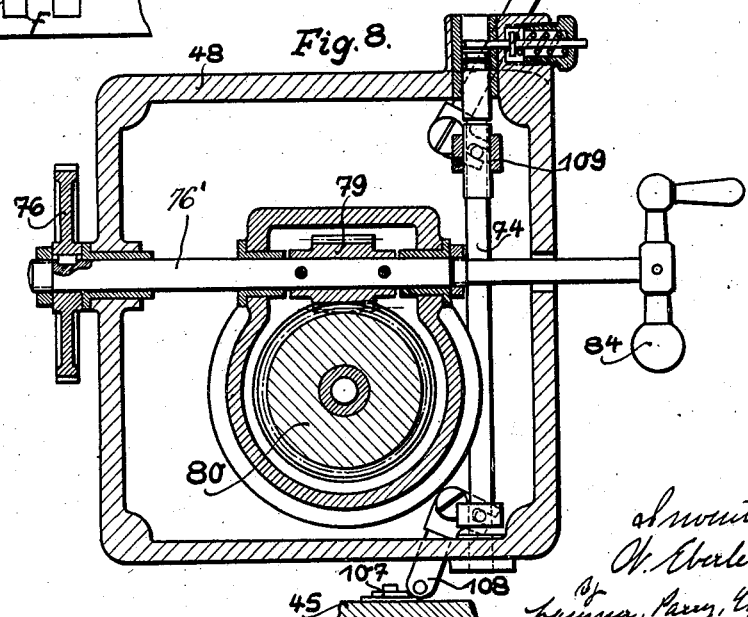

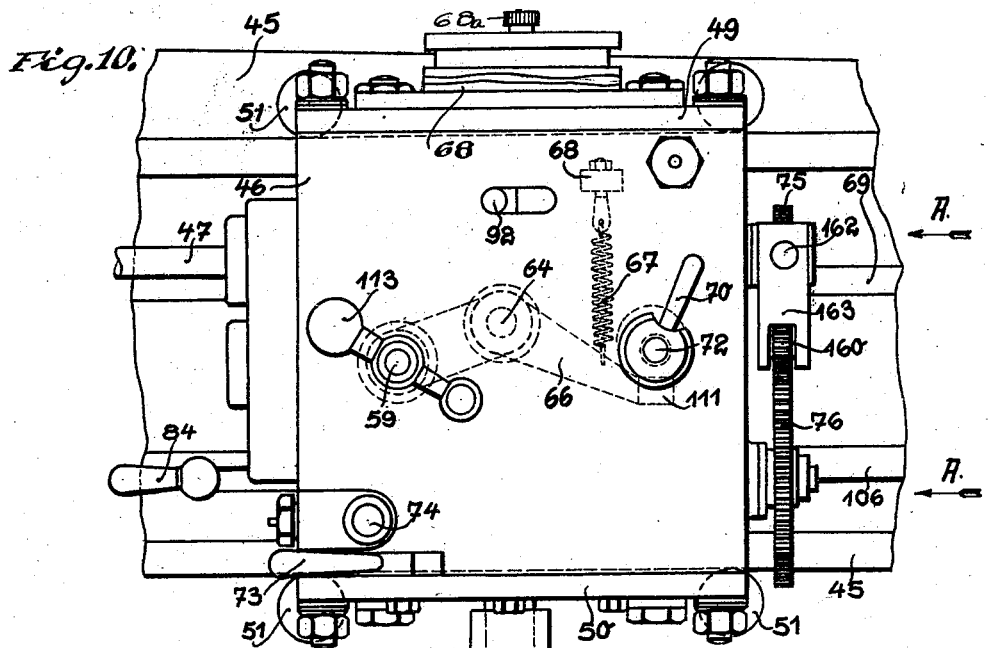

Patented Feb. 25, 1930

1,748,870

UNITED STATES PATENT OFFICE

WILHELM EBERLE, OF FRANKFORT-ON-THE-MAIN, GERMANY

MACHINE FOR GUIDING CUTTING BURNERS

Application filed October 1, 1928, Serial No. 309,504, and in Germany October 8, 1927.

This invention relates to a machine for the autogenous cutting of metals along straight lines, at right angles, along circles, and with the use of stencils along any kind of lines, which are to be specially used at the treating of blanks of greater length, as for instance in shipbuilding and wagon-building.

In a machine of older type for the mechanical longitudinal—transverse—circular—and stencil guiding of a cutting burner, which was also designed for carrying out cuts of greater length, the guiding device for a burner was shiftably arranged on one slide bar, and the driving mechanism for the guiding device on a second guide bar parallel to the first mentioned guide bar. A flexible shaft served for transmitting the movement between the driving mechanism and the guiding mechanism. The control of the machine was constructed so that one and the same device served for all the movements forward or backward or for the stopping, so that the form of movement could be changed only by stopping the one movement before a new movement could be put in.

In comparison hereto the machine, according to this invention, and also its driving mechanism, is movably arranged on one single guide bar of any desired length on which it can be mechanically propelled for the longitudinal guiding of the cutting burner at a predetermined uniform speed. Herefrom results in comparison with the machine of older type the advantage, that much less space is required and the attendance is considerably simplified. In the new machine every burner movement can be controlled by a separate handle independently of the other movements. It is therefore possible to carry out consecutively different movement-forms without interruption of the burner movement, this being important as by such interruptions of the burner movement, be they ever so short, the cutting face is seriously damaged. With the aid of the new machine any burner movements composed of straight lines and arc-shaped lines extending at an angle to each other can be carried out without a break. As such cuts are frequently necessary in engine building the new machine means a considerable progress over a guiding mechanism in which any change of the movement-form is connected with the temporary stopping of the burner movement.

An embodiment of the invention is illustrated, by way of example, in the accompanying drawing, in which Fig. 1 is a side elevation of the machine.

Fig. 1ª is a side elevation showing a continuation of the longitudinal guide member 45 and its appertinent parts shown broken away at the upper right hand side of Fig. 1.

Fig. 2 is a top plan view of the base plate of the carriage frame.

Fig. 3 is a top plan view of a portion of the machine.

Fig. 4 is a vertical cross section through the swivel casing for the longitudinal movement.

Fig. 5 is a vertical cross section on line V—V of Fig. 6.

Fig. 6 is a horizontal cross section on line VI—VI of Fig. 5.

Fig. 7 is a vertical longitudinal section on line VII—VII of Fig. 5.

Fig. 8 is a horizontal cross section on line VIII—VIII of Fig. 5.

Fig. 9 is a horizontal cross section on line IX—IX of Fig. 5.

Fig. 10 is a top plan view showing the burner carriage.

Fig. 11 illustrates the course of a cut.

Figure 1:
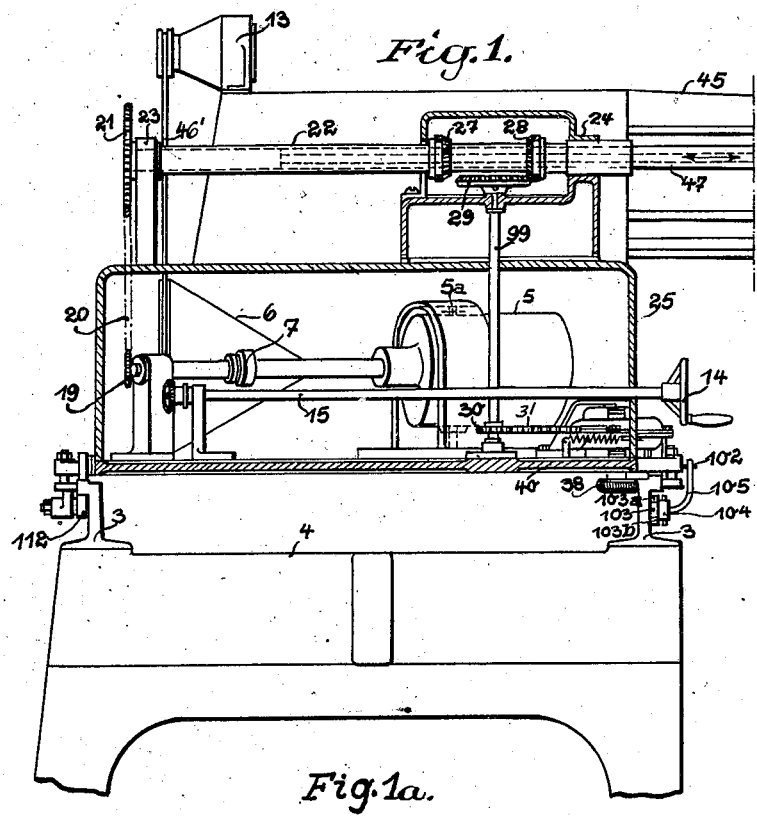
Figure 1A:
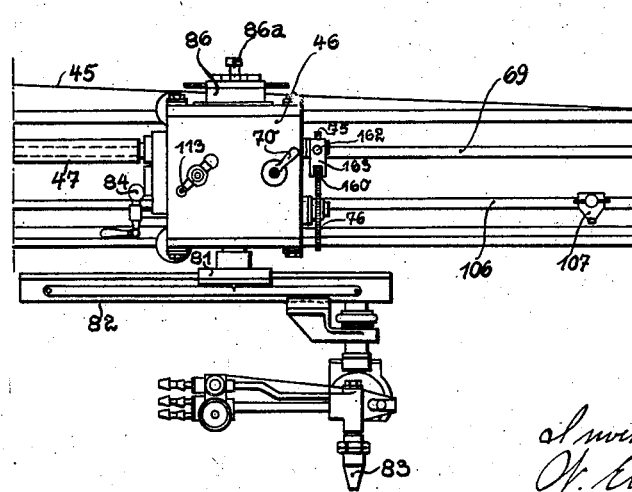

The rectangular base plate 1 of the carriage frame rests, by means of four wheels 2, on two rails 3. Four rollers 114 serve for the lateral guiding on the rails. A roller 112 prevents tipping of the machine around the front rail. The rails 3 are mounted on a stationary standard 4. The base plate 1 of the carriage frame carries as driving means for the machine an electromotor 5 oscillatable around a vertical stud 5ª and a smooth friction cone 6 with friction roller 7 the latter being mounted on an extension 10 of the motor shaft, the outer end of said shaft extension being journaled in a spring-controlled bearing 9, so that the friction roller 7 is pressed against the friction cone 6. A hand wheel 14 serves for positively shifting the friction roller 7 on shaft 10 to adjust the desired number of revolutions of the axle 12 of friction cone 6, the rotation of said hand wheel 14 being transmitted by a spindle 15 and a pair of bevel wheels 16 upon a screw spindle 17 on which a fork 18 travels which guides the friction roller 7. A sprocket wheel 19 on the axle 12 of cone 6 drives, by a link chain 20, a sprocket wheel 21 on the end of the hollow main shaft 22 which is journaled in bearings 23 and 24 on a casing 25 placed over the base plate 1. Two bevel wheels 27, 28 commonly operated by a fork 26 (Fig. 3) are shiftably mounted on the main shaft 22 and adapted to be brought from the one or other side into engagement with a bevel wheel 29, when a lever 93 (Fig. 3) having fork-shaped ends, pivotally mounted on a pivot pin 94, is oscillated by means of a handle 98, one end of said lever engaging over a pin 95 of fork 26 and the other end engaging over a pin 96 of a rod 97 mounted on an arm 45. The bevel wheel 29 is keyed on a vertical spindle 99 (Fig. 1) which carries on its lower end a sprocket wheel 30 connected by a link chain 31 with a sprocket wheel 32 (Fig. 4). This sprocket wheel 32 is mounted, together with a spur wheel 33, on an axle 34, the lower end of which is journaled in the base plate 1 and the upper end in a bearing arm 35 fixed on said base plate. A casing 36 enclosing the elements 32, 33 and 34 is adapted to oscillate around the axle 34, and in this casing 36 an axle 37 is rotatably mounted which carries a spur wheel 110 meshing with the spur wheel 33 and on its lower end, which projects through a slot of the base plate, a milled roller 38 (Fig. 1). The casing 36 has an arm 39 controlled by a spring 40 attached to the base plate 1 so that the milled roller 38 is pressed against the inner side of the corresponding rail 3. An eccentric roller 43, on the arm of a lever 42 adapted to be oscillated around a pin 44 on the base plate, serves to act upon a second arm 41 of the casing 36 to lift the roller 38 off the rail.

When the electromotor is started and one of the bevel wheels 27 and 28 is brought into engagement with the bevel wheel 29, the carriage frame moves, according to the adjusting of the friction gear slowly or more rapidly at uniform speed, on the rails 3, if the milled roller 38 is pressed against the corresponding rail 3. The travelling speed of the burner movement is indicated by a speedometer 13, driven by a round belt 46' from the cone 6. This speedometer indicates the speed of every put-in burner movement, which are all controlled from the same main driving element. When the bevel wheel 27, 28 respectively is disengaged from the bevel wheel 29, the machine is stopped. The direction of travel depends on the selection of the bevel wheel 27 or 28 which is brought into engagement with the bevel wheel 29.

When the milled roller 38 is moved away from the corresponding rail 3 by reversing of lever 42, the carriage frame carrying the machine can be shifted on the rails by hand or by means of a stencil.

On the casing 25 an arm 45, constructed as a hollow member, is arranged at right angles to the track. The burner carriage 46 is shifted on this arm and serves to move the burner 83 fixed on it in a straight line, parallel to the longitudinal axis of said arm, to guide it along arcs of circles of certain diameters, and to move along any desired curved lines the burner together with its rollers guided by stencils.

The driving gear arranged in the casing of the burner carriage designed for controlling the burner movement is driven from the main driving shaft 47, which is slidable in the hollow main shaft 22 but secured by groove and feather against rotation with regard to this hollow shaft, and it serves to transmit the rotating movement of the main shaft 22 to the main axle 54 of the driving gear for the burner carriage. If this driving gear is engaged so that the burner carriage moves along the arm, the shaft 47 rotates at the same time and slides in the hollow shaft 22.

The burner carriage 46 consists of a frame 48 of rectangular cross section closed at the top end by a plate 49 and at the bottom end by a plate 50. The plates 49 and 50 project over the frame 48 at one side and have in the projecting portions supporting rollers 51 and lateral guide rollers 52 which bear against rail heads 53 of the arm 45 (Fig. 5).

The main driving shaft 54 journaled in the carriage 46 and rigidly connected with the main shaft 47 and from which the several burner movements to be carried out by the carriage are derived, causes the longitudinal movement of the burner on the arm by means of a spur wheel 55 keyed on said shaft 54 and meshing with a spur wheel 56 (Fig. 7), on the axle 57 to which a bevel wheel 58 is keyed and located in the casing and forming a reversing gear together with two bevel wheels 60 and 61 slidably mounted on a spindle 59 and connected with each other by a bush 59' (Figs. 5 and 6). The spindle 59 carries further a spur wheel 62 meshing with a spur wheel 63, the axle 64 of which is journaled in an arm 66 adapted to oscillate around the spindle 59 and carrying on the outer side of the casing a milled roller 65.

The oscillatory arm 66 is pulled upward by a spring 67 (Fig. 10) attached to a projection 68 of frame 48 so that the milled roller 65 is pressed against a ledge 69 on the arm 45. When the main gear shaft 54 is rotated and one of the two bevel wheels 60 and 61 brought into engagement with the bevel wheel 58, the burner carriage moves along the arm owing to the friction taking place between the milled roller 65 and the ledge 69. The direction of the movement depends on the selection of the bevel wheel which is engaged. When the reversing gear 58, 60, 61 is disengaged, the carriage is stopped. It might however be shifted by hand with the aid of a crank handle 113. The milled roller 65 may be lifted off the ledge 69 by turning of a lever 70 which moves a spindle 72 on which an eccentric roller 71 is keyed (Fig. 6) which, at the rotation of the spindle, acts upon an extension 111 of the oscillatory arm 66 and presses this arm down against the action of the spring. In this manner free movability of the carriage on the arm is obtained. The engaging of the reversing gear 58, 60 and 61 is effected by a lever 73 (Figs. 5 and 8) which controls a fork 109 guided on a guide rod 74 and controlling the shifting of the bevel wheels 60 and 61 on the spindle 59.

Figure 12:
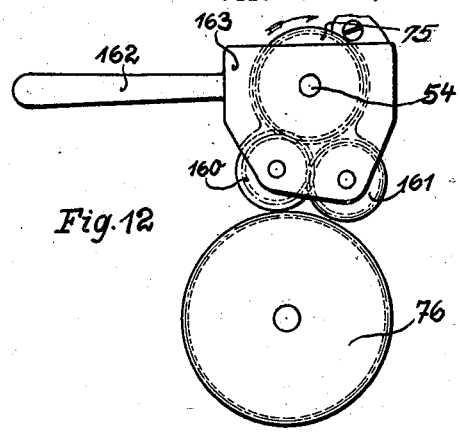
Figs. 12, 13, 14 show, viewed in the direction of the arrow line A—A, in elevation a control arrangement, each figure showing another operative position.
Figure 14:
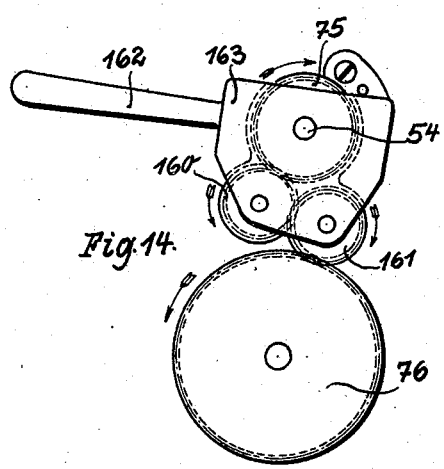
Figure 13:
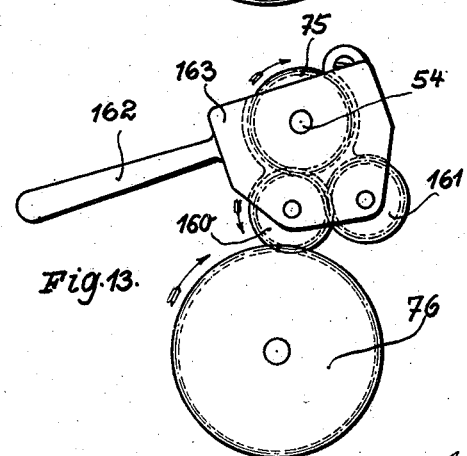

An arc-shaped movement of the burner is produced by a spur wheel 75 (Figs. 1ª, 7, 9 and 10) keyed on the main shaft 54 and meshing, through the intermediary of a gear formed by two small wheels 160, 161, Figs. 12, 14 and 15, with a spur wheel 76, the shaft 76' of which carries a worm 79 which drives a worm wheel 80 (Fig. 8). The spur wheel 75 is permanently in gear with wheel 160 which gears with wheel 161 and these three wheels are all mounted in a flat casing 163 which is adapted to be oscillated by means of a handle 162 around the shaft 54 so that either the wheel 160 or the wheel 161 or none of these wheels comes to mesh with the spur wheel 76 (Figs. 12, 13 and 14). The casing 163 comprises a stud 165 pressed outward by the action of a spring 164 and engaging, at any of the above described positions of the spur wheels, with an indentation in the wall of the burner carriage so that the casing 163 is secured in its position. According to whether the spur wheel 160, 161 or none of the same gears with the wheel 76 the shaft, driven by this wheel and thereby the worm wheel gear producing the circulating movement is moved in the one or other direction or remains inoperative. The shaft of the worm wheel 80 carries at its lower end on the outer side of the carriage casing a link 81 in which a bar 82 carrying the burner 83 can be shifted (Fig. 1). The radius of the arc along which the burner has to be moved is adjusted by shifting of the bar. The arc-shaped movement, instead of being mechanically controlled, may be effected by hand, the spur wheels 160, 161 being disengaged from spur wheel 76 and then operating a crank handle 84 mounted on the other side of the worm axle.

A driving head 86 is further arranged on the burner carriage and designed to guide the burner with the aid of stencils along any irregular curved lines. The driving head 86 carries a milled roller 86ª which is held in contact with the stencil by a counter roller not shown acting with tension upon the other face of the stencil. On the driving axle 87 of this driving head a bevel wheel 88 (Fig. 7) is keyed which, according to the desired direction of rotation, may be brought into engagement with the one or other of the bevel wheels 89 and 90 shiftable on the main shaft 54. The bevel wheels 89 and 90 are connected by a fork 91 (Fig. 9) with a handle 92, by the shifting of which in lateral direction forward running, stop and backward running of the stencil guide device may be adjusted. The fork handle is guided and adjusted by a guide rod 150 shiftable in the casing and having notches or annular grooves 151 with which a spring-controlled pin 152 engages. A threaded sleeve 153 on the middle portion of the guide rod 150 grips over the handle 92 and is adapted to be shifted by the rotation of rod 150, produced by a screw driver to be inserted in the slot 154 in the end of said rod, whereby the handle with the fork is adjusted to effect the correct meshing of the bevel wheels 88, 89 and 90. When the burner has to be guided by means of stencils the levers 42 (Fig. 2) and 70 (Fig. 6) have previously to be turned so that the carriage frame and the burner carriage are freely movable on their bars and the machine forms the system of a freely movable cross slide.

The machine comprises further arrangements making it possible to automatically interrupt at any desired point of the course the mechanical propelling of the carriage frame on the rails 3 (longitudinal movement) as well as that of the burner carriage on the arm 45 (transverse movement). For stopping the movement of the carriage frame a vertical shaft 100 is provided, which is mounted at the side of the casing 25 and which has an arm 101 gripping over a stud projecting from rod 97 (Fig. 3). On the lower end of shaft 100 a rod 102 is fixed at right angles to the arm 101. On the web of the front rail 3 a dove-tailed carriage guide is formed by bars 103ª and 103ᵇ in which two blocks 103 are shiftably mounted designed to limit the forward and backward movement of the machine and adapted to be secured by means of clamp nuts 104 at any desired point of the carriage guide. To each block 103 an offset rod 105 is fixed. In order to stop automatically the longitudinal movement of the machine at any desired point of the travel the block 103 is secured in its position at the corresponding point of the carriage guide so that the rod 102 strikes against the offset rod 105 and, when the machine continues to run, the shaft 100 is rotated. The arm 101 of shaft 100 effects then an according displacement of rod 97 by which the gear wheels 27, 28, 29 are disengaged and the longitudinal movement of the machine is interrupted.

The automatic disengaging of the transverse movement of the burner carriage is effected by an abutment 107 adjustable in a longitudinal groove 106 (Fig. 1) of the arm, a lever 108 being thereby oscillated which effects shifting of the guide rod 74 which carries a fork 109 (Fig. 8).

The machine described is constructed so that all burner movements can be controlled from one single point permanently situated in proximity of the burner 83 and in such a manner that every individual movement can be controlled alone by a separate handle provided for this purpose and independently of the other movements. The possibility to carry out the transverse movement and circular movement also by hand by means of the cranks 113 and 84 permits of rapidly and accurately adjusting the burner with regard to the blank.

The operation of the machine will be hereinafter explained by way of a simple example. From a plate the rod head shown in Fig. 11 has to be cut in one operation. After the plate, on which the rod head to be cut has been drawn, has been adjusted with regard to the machine and this machine with regard to the plate, the cut is started at the point $a$ by engaging the longitudinal movement of the carriage frame by means of the handle 98. At point $b$ the transverse movement of the burner carriage is engaged by accordingly turning the lever 73, and directly after this the handle 98 is moved so that the longitudinal movement of the carriage frame is stopped. The inverse operations take place at point $c$ and so on until the burner arrives at the point $d$. At this point the circular movement is engaged and the longitudinal movement disengaged. At point $e$ the burner is again reversed from circular movement to longitudinal movement, at point $f$ from longitudinal movement to transverse movement, until at the beginning of line $a$—$b$ the cut is terminated by extinguishing the burner and by stopping the burner carriage.

In following the operation of this device as above described it will be understood that the underlying and main object of the invention is to prevent the burner stopping at any point in its path of travel due to the changing of the machine from one motion to another of the burner or the modifying of any one or more of its motions.

For instance, there are three distinct movements capable of being independently imparted to the burner. One of these is the transverse movement of the base or support. This as is best shown in Figs. 1, 2 and 4 is accomplished by taking off power from the main shaft 47 by way of the vertical shaft 99 and imparting it to the friction wheel 38 reacting against the track. It is obvious that this power can be reversed in direction through the gears 27 and 28 or discontinued altogether by placing the gear 29 in neutral position with respect to gears 27 and 28, without in the least affecting the movement of the shaft 47 by which the other two movements of the burner are produced. In the same manner, referring to Fig. 5, it is obvious that the shaft 59 which controls the longitudinal movement of the burner carrier, through operation of the friction wheel 65 may be reversed or placed in neutral with respect to the gear 58 which is a continuation of the shaft 47, without in the least affecting the operation of the shaft 47 and without affecting the operation of the shaft 99 which controls the transverse movement of the support.

Likewise, it may be shown that the shaft 47 and its continuation 54, by means of the gears 75, 160 and 76 drives the shaft 76' which operates through the worm connection 79 and 80, the oscillating mechanism 81 of the burner. Since the inhibition or modification of the motion producing means relating to the transverse movement of the support or longitudinal movement of the burner carrier do not affect in any way the rotation of the shaft 47, it is obvious that they cannot have any effect upon the operation of the oscillating mechanism which is directly controlled by the shaft 47 and its continuation 54. Conversely, the oscillating mechanism may be reversed or thrown into neutral by oscillating the gear assembly shown in Figs. 12, 13 and 14 without affecting the shaft 47 and, therefore without modifying the transverse or longitudinal movements of the respective parts of the machine. Therefore, it can be clearly understood that no matter what reversal of motion is effected or which of the several motions is inhibited by placing its connection with the line of drive into neutral, this cannot in any way affect the independent operation of the other motion producing means.

Now, in order to place the machine, that is to say, the movements of the burner altogether under the influence of the stencil engaging friction wheel 86$^a$ it is only necessary to release the machine from the control of the respective collateral drives as hereinbefore described. This is done, in the case of the mechanism for effecting the transverse movement of the support by operating the eccentric lever 42 rocking the friction wheel 38 out of engagement with the rail. In the case of the means for producing the longitudinal movement of the burner carrier, its control is released by operating the eccentric lever 70 shown in Fig. 10 rocking the friction wheel 65 out of engagement with the track 69. With regard to the oscillating mechanism, it is thrown out of operation merely by the movement of the gear assembly controlled by the lever 162 to neutral position.

I claim:—

1. Machine for guiding a cutting burner comprising a traveling support, a source of power carried by said support and driving the same, a travelling carriage for supporting the burner, also carried by said support and driven by said source of power, and means for modifying the movement of travel of either of said travelling members, without modifying the movement of travel of the other.

2. Machine for guiding a cutting burner comprising means for moving the burner transversely, means for moving it longitudinally, and means for moving it arcuately, a power device for actuating said moving means, and means for modifying the operation of any of said moving means without modifying the operation of the remaining moving means.

3. Machine for guiding a cutting burner comprising a travelling support, propelling means therefor reacting against a stationary guide, a source of power carried by said support for driving the propelling means, a travelling burner carriage, guiding means for said carriage extending perpendicular to the direction of travel of said support, propelling means for said carriage reacting against said guiding means, and driven by said source of power, additional propelling means carried by said carriage and driven by said source of power and means for releasing the propelling means of said support and carriage from engagement with the respective guiding means leaving the machine free to move responsively to the reaction of said additional propelling means against the guiding edge of a stencil suitably positioned.

4. Machine for guiding a cutting burner comprising a travelling support, propelling means therefor, reacting against a stationary guide, a travelling burner carriage, guiding means for said carriage extending perpendicularly to the direction of travel of said support, propelling means for said carriage reacting against said guiding means, a source of power carried by said support, travelling connections between said source of power and the propelling means for said support and said carriage comprising separate driving connections for each propelling means including mechanism for reversing the direction of travel of each propelling means, each of said means being operable independently of the other.

5. Machine for guiding a cutting burner comprising a travelling support, propelling means therefor, reacting against a stationary guide, a travelling burner carriage, guiding means for said carriage extending perpendicularly to the direction of travel of said support, propelling means for said carriage reacting against said guiding means, a source of power carried by said support, travelling connections between said source of power and the propelling means for said support and said carriage comprising separate driving connections for each propelling means including mechanism for reversing the direction of travel of each propelling means, each of said means being operable independently of the other, and separate control handles positioned in proximity to the burner carriage for controlling each movement of the machine independently of any other movement.

6. Machine for guiding a cutting burner comprising a travelling support, propelling means therefor reacting against a stationary guide, a travelling burner carriage carried by said support, guiding means for said carriage extending perpendicularly to the direction of travel of said support, means for imparting oscillatory movements to said burner mounted on said carriage, a source of power carried by said support and driving connections from said source to each of said propelling means and to said burner oscillating means, and couplings in said driving connection, for each of said movement producing means, each coupling being operable to reverse or stop the movement which it controls without in any way affecting the continuity of any movements produced by the other movement producing means.

7. Machine for guiding a cutting burner comprising a travelling support, propelling means therefor reacting against a stationary guide, a travelling burner carriage carried by said support, guiding means for said carriage extending perpendicularly to the direction of travel of said support, means for imparting oscillatory movements to said burner mounted on said carriage, a source of power carried by said support and driving connections from said source to each of said propelling means and to said burner oscillating means, and couplings in said driving connection, for each of said movements producing means, each coupling being operable to reverse or stop the movement which it controls without in any way affecting the continuity of any movements produced by the other movement producing means, said driving connection including a main driving shaft for driving through said couplings, each of the said movements of the burner, a certain portion of the length of said main driving shaft being hollow and an intermediate shaft shiftable in said hollow portion of said main shaft and secured against rotation, said intermediate shaft being connected to said burner carriage for varying the length of said main driving shaft responsively to the longitudinal movement of said burner carriage.

In testimony whereof I affix my signature.

WILHELM EBERLE.